United States Patent
Kelemen et al.

(10) Patent No.: US 8,524,152 B2
(45) Date of Patent: Sep. 3, 2013

(54) SYSTEMS AND METHODS FOR ENHANCING RATES OF IN SITU CARBONATION OF PERIDOTITE

(75) Inventors: Peter B. Kelemen, Hastings on Hudson, NY (US); Juerg M. Matter, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 432 days.

(21) Appl. No.: 12/810,153

(22) PCT Filed: Dec. 31, 2008

(86) PCT No.: PCT/US2008/088619
§ 371 (c)(1),
(2), (4) Date: Aug. 30, 2010

(87) PCT Pub. No.: WO2009/086551
PCT Pub. Date: Jul. 9, 2009

(65) Prior Publication Data
US 2010/0324351 A1    Dec. 23, 2010

Related U.S. Application Data

(60) Provisional application No. 61/018,797, filed on Jan. 3, 2008, provisional application No. 61/062,939, filed on Jan. 29, 2008, provisional application No. 61/124,922, filed on Apr. 18, 2008, provisional application No. 61/081,270, filed on Jul. 16, 2008.

(51) Int. Cl.
*G01N 21/00* (2006.01)
*G01N 31/00* (2006.01)
*G01N 33/00* (2006.01)
*F01N 3/20* (2006.01)
*G05B 1/00* (2006.01)
*G05B 21/00* (2006.01)
*G05F 7/00* (2006.01)
*E21B 43/16* (2006.01)
*E21B 43/26* (2006.01)

(52) U.S. Cl.
USPC ............... 422/62; 422/67; 422/105; 422/110; 422/111; 166/305.1; 700/266

(58) Field of Classification Search
None
See application file for complete search history.

(56) References Cited

U.S. PATENT DOCUMENTS 3,330,352 A * 7/1967 Bernard .................. 166/263
5,069,283 A   12/1991 Mack
(Continued)

FOREIGN PATENT DOCUMENTS

NL    1028399    8/2006
WO    2008128331 A1    10/2008

OTHER PUBLICATIONS

Mani et al., Assessment of Carbon Dioxide Sequestration Potential of Ultramafic Rocks in the Greenstone Belts of Southern India, Current Science, Vo. 94, No. 1, Jan. 10, 2008.*

(Continued)

*Primary Examiner* — Jill Warden
*Assistant Examiner* — Charles D Hammond
(74) *Attorney, Agent, or Firm* — Wiggin and Dana LLP; Anthony P. Gangemi (57) ABSTRACT

Methods and systems for enhancing rates of in situ carbonation of peridotite are disclosed. In some embodiments, the methods and systems include the following: fracturing a volume of peridotite in situ; heating the volume of peridotite in situ; injecting carbon dioxide into the volume of peridotite in situ; and forming carbonate in situ with the volume of peridotite and the carbon dioxide.

6 Claims, 5 Drawing Sheets

(56) References Cited

U.S. PATENT DOCUMENTS

| | | | |
|---|---|---|---|
| 5,954,452 A | 9/1999 | Goldstein | |
| 7,922,643 B2* | 4/2011 | Bruno et al. | 588/250 |
| 8,323,481 B2* | 12/2012 | Dana et al. | 208/400 |
| 2004/0200618 A1* | 10/2004 | Piekenbrock | 166/305.1 |
| 2005/0180910 A1* | 8/2005 | Park et al. | 423/432 |
| 2006/0120806 A1* | 6/2006 | Leone et al. | 405/129.85 |
| 2007/0056726 A1 | 3/2007 | Shurtleff | |
| 2007/0237696 A1 | 10/2007 | Payton | |
| 2010/0000737 A1* | 1/2010 | Ramakrishnan et al. | 166/297 |
| 2010/0051859 A1 | 3/2010 | House et al. | |
| 2011/0035154 A1* | 2/2011 | Kendall et al. | 702/14 |
| 2012/0164042 A1* | 6/2012 | Kelemen et al. | 423/155 |
| 2013/0064604 A1* | 3/2013 | Han et al. | 405/53 |

OTHER PUBLICATIONS

O'Connor et al. Continuing Studies on Direct Aqueous Mineral Carbonation for CO2 Sequestration, 27th International Technical Conf. On Coal Utilization & Fuel Systems, Clear Water, FL Mar. 4-7, 2002.*

International Search Report and the Written Opinion of the International Searching Authority, International Application No. PCT/US/2008/088619, filed Dec. 31, 2008.

Park, Ah-Hyung Alissa, "Carbon Dioxide Sequestration: Chemical and Physical Activation of Aqueous Carbonation of Mg-Bearing Minerals and pH Swing Process," The Ohio State University, 2005.

Dick, Henry J.B., Natland, James H., and Ildefonse, Benoit, "Past and Future Impact of Deep Drilling in the Oceanic Crust and Mantle," Oceanography, vol. 19, No. 4, Dec. 2006.

Bachu, S., "CO2 storage in geological media: Role, means, status and barriers to deployment," Progress in Energy and Combustion Science, vol. 34, pp. 254-273, 2008.

Supplemental European Search Report, International Application No. PCT/US2008/088619, dated Jul. 16, 2012.

* cited by examiner

SYSTEMS AND METHODS FOR ENHANCING RATES OF IN SITU CARBONATION OF PERIDOTITE

CROSS REFERENCE TO RELATED APPLICATION(S)

This application claims the benefit of U.S. Provisional Application Nos. 61/018,797, filed Jan. 3, 2008, 61/062,939, filed Jan. 29, 2008, 61/124,922, filed Apr. 18, 2008, and 61/081,270, filed Jul. 16, 2008, each of which is incorporated by reference as if disclosed herein in its entirety.

BACKGROUND

Recognition that anthropogenic carbon dioxide ($CO_2$) input to the atmosphere has substantially increased atmospheric carbon dioxide concentration, coupled with the theory that increased carbon dioxide, in turn, could drive rapid global warming, has focused attention on techniques—known as carbon sequestration—to remove some carbon dioxide from the atmosphere. One possibility is the conversion of carbon dioxide gas to stable, solid carbonate minerals such as calcite ($CaCO_3$) and magnesite ($MgCO_3$).

Because of its high concentration of Mg, tectonically exposed peridotite from the Earth's upper mantle, which is composed largely of the mineral olivine (($Mg,Fe)_2SiO_4$), with lesser proportions of pyroxene minerals (($Mg,Fe,Ca)_2Si_2O_6$) and spinel (($Mg,Fe)(Cr,Al)_2O_4$), and its hydrous alteration product serpentine, have been considered a promising reactant for conversion of atmospheric carbon dioxide to solid carbonate.

Natural carbonation of peridotite has been found to be surprisingly rapid. For example, carbonate veins in mantle peridotite in Oman have an average $^{14}C$ age of approximately 26,000 years, and are not 30 to 95 million years old as previously believed. These data and reconnaissance mapping show that approximately $10^4$ to $10^5$ tons per year of atmospheric carbon dioxide are converted to solid carbonate minerals via peridotite weathering in Oman. Mantle peridotite is ordinarily more than 6 km below the seafloor, and is strongly out of equilibrium with air and water at the Earth's surface. Its exposure along large thrust faults and along tectonic plate boundaries creates a large reservoir of chemical potential energy.

Despite the available chemical potential, engineering techniques for carbon sequestration have many challenges. Engineering solutions involve grinding peridotite to a fine powder, purifying carbon dioxide gas, using reaction vessels at elevated pressure, and/or heating reactants to 100 degrees Celsius or more, and this comes at a substantial financial and energy cost.

Various methods have been experimentally evaluated, including direct carbonation of olivine and serpentine powders at elevated temperature, dissolution of serpentine or olivine in hydrochloric acid followed by carbonation of Mg and Ca ions in solution, and reaction of olivine and serpentine with carbonic acid (very similar to natural alteration). Reaction kinetics have been found to be too slow for significant sequestration of carbon dioxide unless the olivine or serpentine reactants are raised to more than 100 degrees Celsius, ground to a fine powder, and/or pre-treated at >600 degrees Celsius to increase reactive surface area. For the most part, because of the requirements for heating and processing, these approaches have been found to be too expensive—in financial terms and, more importantly, in energy expenditure—to be commercially viable at present.

SUMMARY

Generally, the disclosed subject matter relates to accelerating and controlling natural peridotite carbonation in situ by optimizing the conditions for carbonation reactions between peridotite in situ and a source of carbon dioxide to be sequestered, e.g., carbon dioxide captured from power plant emissions, carbon dioxide captured from atmospheric air, or carbon dioxide contained in bodies of water local to the peridotite.

Carbonation of olivine and pyroxene, which are components of peridotite, can generally be represented by the following reactions:

Sequestration of carbon dioxide according to the disclosed subject matter includes facilitating and controlling carbonation reactions like [1], [2], and [3] between the carbon dioxide to be sequestered and peridotite in situ.

Some embodiments of the disclosed subject matter include systems and methods for enhancing the rates of in situ carbonation of peridotite. Rates of carbonation can be enhanced by altering the conditions under which reactions like [1], [2], and [3] occur. In some embodiments of the disclosed subject matter, drilling, hydraulic fracture, input of carbon dioxide at elevated pressure, and increasing the temperature of the peridotite at depth are used to enhance conditions for reactions like [1], [2], and [3]. Alternatively, some embodiments include controlled convection of local, dissolved carbon dioxide found in adjacent seawater as the source of the carbon dioxide for reaction with the peridotite.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
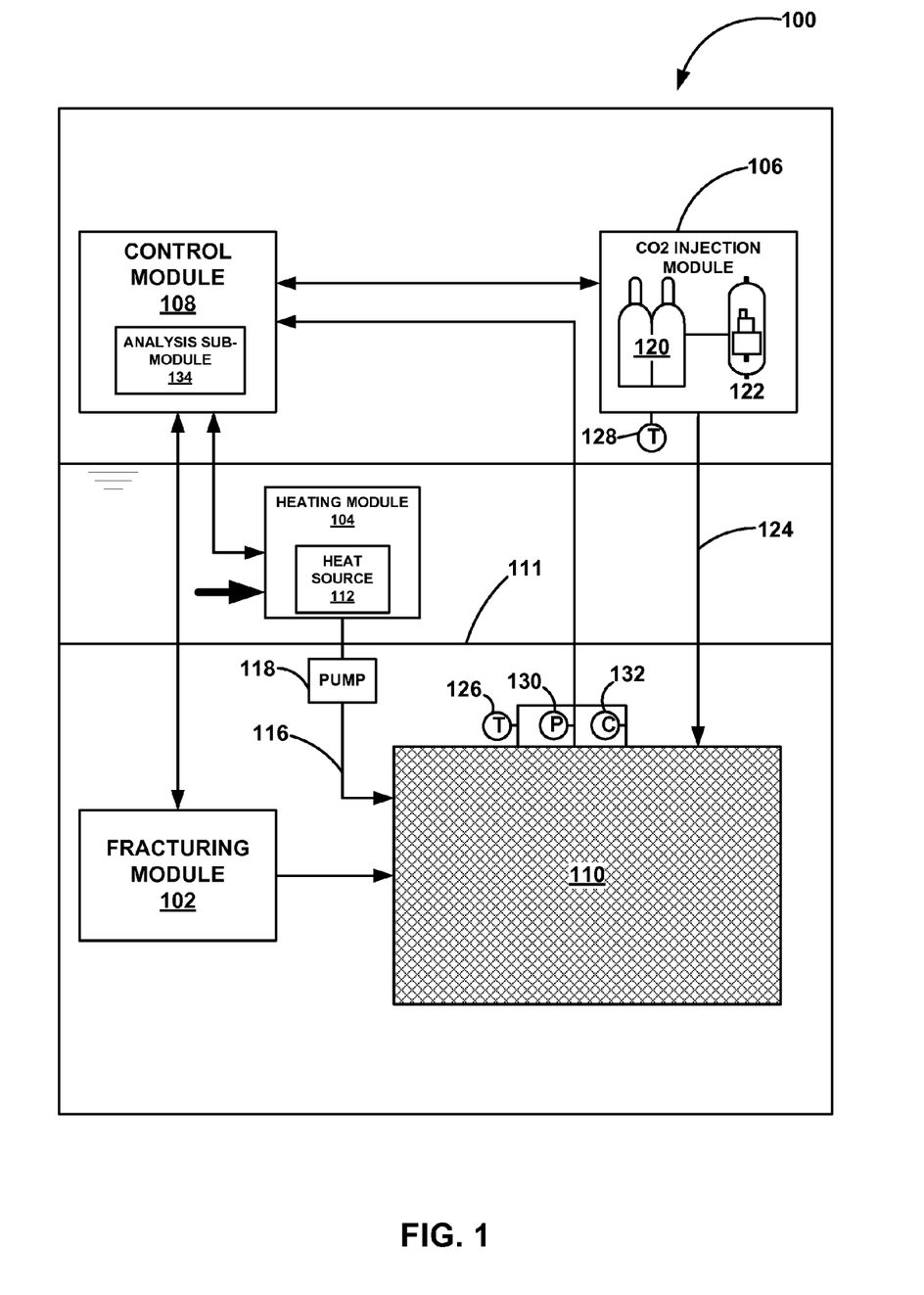
FIG. 1 is a diagram of a system and method according to some embodiments of the disclosed subject matter.
Figure 2:
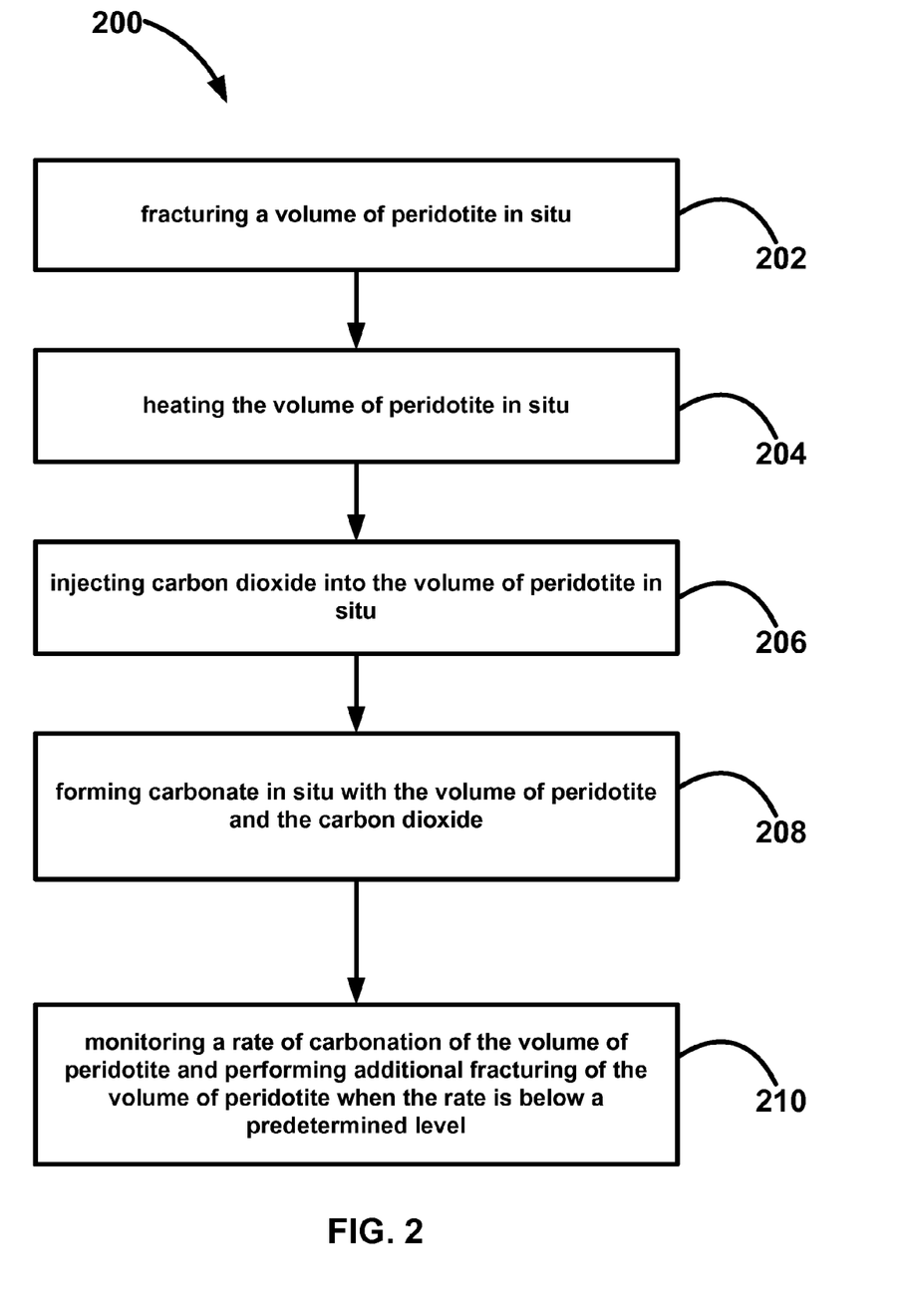
FIG. 2 is a chart of a method according to some embodiments of the disclosed subject matter.

Referring now to FIGS. 1 and 2, some embodiments include systems and methods for sequestering carbon dioxide via in situ carbonation of peridotite. Some embodiments include a system 100 having a fracturing module 102, a heating module 104, a carbon dioxide injection module 106, and a control module 108 for facilitating and controlling carbonation reactions in situ.

Fracturing module 102 includes apparatus (not shown) for fracturing a volume 110 of peridotite in situ. Volume 110 is typically located at a depth below a floor 111 of a body of water such as an ocean or sea. In some embodiments, fracturing volume 110 is accomplished using known drilling and hydraulic fracturing techniques and equipment currently used in mineral and petroleum exploration. Drilling and hydraulic fracture are used to increase the depth (and volume) of peridotite readily available for reaction by a factor of 200, i.e., from about 15 meters to about 3 km in the peridotite. Additional naturally occurring fracture of peridotite is likely as a result of thermal expansion during heating, volume increase during hydration, and volume increase during carbonation.

Heating module 104 is used to heat volume 110 of peridotite in situ. Heating module 104 includes a heat source 112 for heating a volume of fluid (not shown) thereby creating a heated volume of fluid (not shown), a conduit 116 formed between the heated volume of fluid and volume 110 of peridotite, and a pump 118 for pumping the heated volume of fluid to the volume of peridotite. Because volume 110 of peridotite is generally, but not always, at depth, i.e., under a body of water, seawater covering the peridotite is typically used as the source for the volume of fluid. Preheating the peridotite volume to the optimal temperature for peridotite carbonation, which is about 185 degrees Celsius, jump starts the carbonation reaction. Heating the peridotite can be achieved via a variety of flow rates, fluid temperatures, and fluid compositions. Eventually the exothermic heat output from the carbonation reactions will maintain a temperature 185 degrees Celsius in the peridotite volume. Over time, output fluid that is heated by the exothermic heat can be used to heat other areas of the peridotite volume. This likely will occur spontaneously as hot fluid flows into colder, surrounding rock.

Carbon dioxide injection module 106 includes a carbon dioxide source 120 that can include carbon dioxide that has been captured from either atmospheric air or power plant emissions, and a compressor 122 for compressing the carbon dioxide thereby increasing the pressure of the carbon dioxide. The pressurized carbon dioxide from carbon dioxide source 120 is injected into volume 110 of peridotite in situ via a conduit 124 between the carbon dioxide source and the volume of peridotite. If necessary, additional measures can be taken to ensure that the carbon dioxide in carbon dioxide source 120 is substantially purified prior to injection into volume 110. Injection of pure carbon dioxide or a carbon dioxide rich fluid mixture, versus the utilization of dissolved carbon dioxide in surface water, helps keep pace with the enhanced carbonation reaction rate.

Control module 108 includes temperature sensors 126 and 128 for monitoring the temperatures of volume 110 of peridotite and carbon dioxide source 120. Control module 108 includes a pressure sensor 130 for monitoring a pressure of carbon dioxide injected into volume 110 of peridotite and one or more carbonation sensors 132 for monitoring the rate of carbonation occurring in the volume of peridotite. Control module 108 also includes an analysis sub-module 134 for analyzing data generated by temperature, pressure, and carbonation sensors 126, 128, 130, and 132, respectively. Based on the results of the analysis by analysis sub-module 134, fracturing module 102, heating module 104, and carbon dioxide injection module 106 are controlled. For example, control module 108 can be programmed to direct fracturing module 102 to perform additional fracturing of volume 110 of peridotite when the rate of carbonation falls below a predetermined level. Also, control module 108 can be configured so that it discontinues operation of heating module 104 when heat from the carbonation reactions occurring within volume 110 of peridotite is capable of maintaining a temperature of about 185 degrees Celsius in the volume of peridotite.

Referring now to FIG. 2, some embodiments of the disclosed subject matter include a method 200 of enhancing rates of in situ carbonation of peridotite. Typically, but not always, the volume of peridotite is located at a depth beneath a body of water. At 202, method 200 includes fracturing a volume of peridotite in situ. In some embodiments, fracturing of peridotite is achieved via drilling, hydraulic fracturing, or other known technologies. At 204, the volume of peridotite is heated in situ. In some embodiments, the peridotite is heated by injecting heated fluids into the volume of peridotite. The heated fluids are generally injected until the volume of peridotite achieves a temperature of at least about 185 degrees Celsius. At 206, carbon dioxide is injected into the volume of peridotite in situ. In some embodiments, the carbon dioxide has a temperature of about 25 degrees Celsius a pressure of about 150 to 300 bars. The flow rate of carbon dioxide is about 0.04 meters per second or other flow rates that help maintain a temperature of about 185 degrees Celsius in the volume of peridotite. At 208, the volume of peridotite and the carbon dioxide react to form carbonate in situ. The carbonation reaction is exothermic thereby generating a heat source. The heat source further heats and maintains the temperature within the volume of peridotite. At 210, a rate of carbonation of the volume of peridotite is monitored and additional fracturing of the volume of peridotite is performed if the rate falls below a predetermined level.

Figure 7:
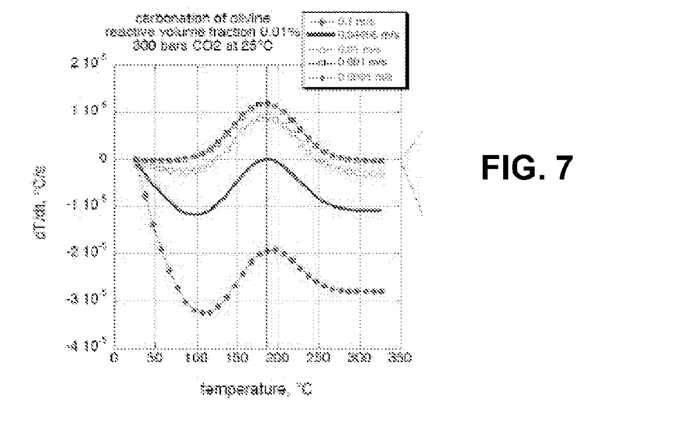
FIG. 7 is a chart of the rate of change of temperature due to olivine carbonation as a function of peridotite temperature and carbon dioxide fluid flow rate.

In some embodiments, holes are drilled in peridotite to a depth in the Earth where the temperature is high enough to sustain high temperatures via reactive heating (positive dT/dt as shown in FIG. 7). The rate of change of temperature in the Earth is commonly 30 degrees Celsius per kilometer, but can be more than 60 degrees Celsius per kilometer in some regions, so reaching 180 degrees Celsius in this manner would likely require drilling to 6 kilometers at 30 degrees per kilometer but only three kilometers at 60 degrees per kilometer. This could eliminate or lessen the need to preheat a region prior to pumping surface temperature fluid and having the exothermic reaction sustain the optimal temperature for peridotite carbonation. Furthermore, the presence of a large reservoir of hot rock at depth could be harnessed to drive thermal convection through drill holes and a fracture network at depth, eliminating some or all of the energy required to pump fluid through this network.

Figure 3:
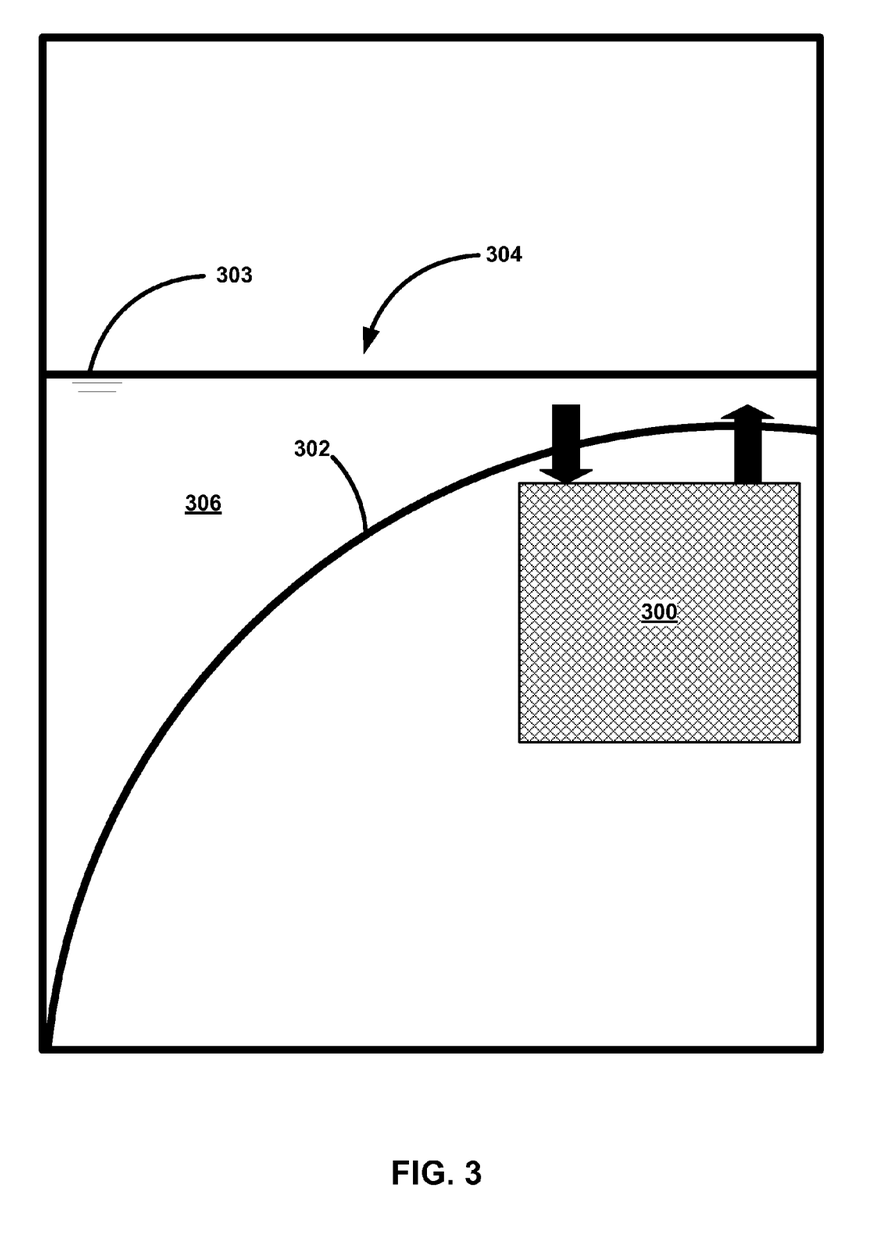
FIG. 3 is a diagram of a system and method according to some embodiments of the disclosed subject matter.
Figure 4:
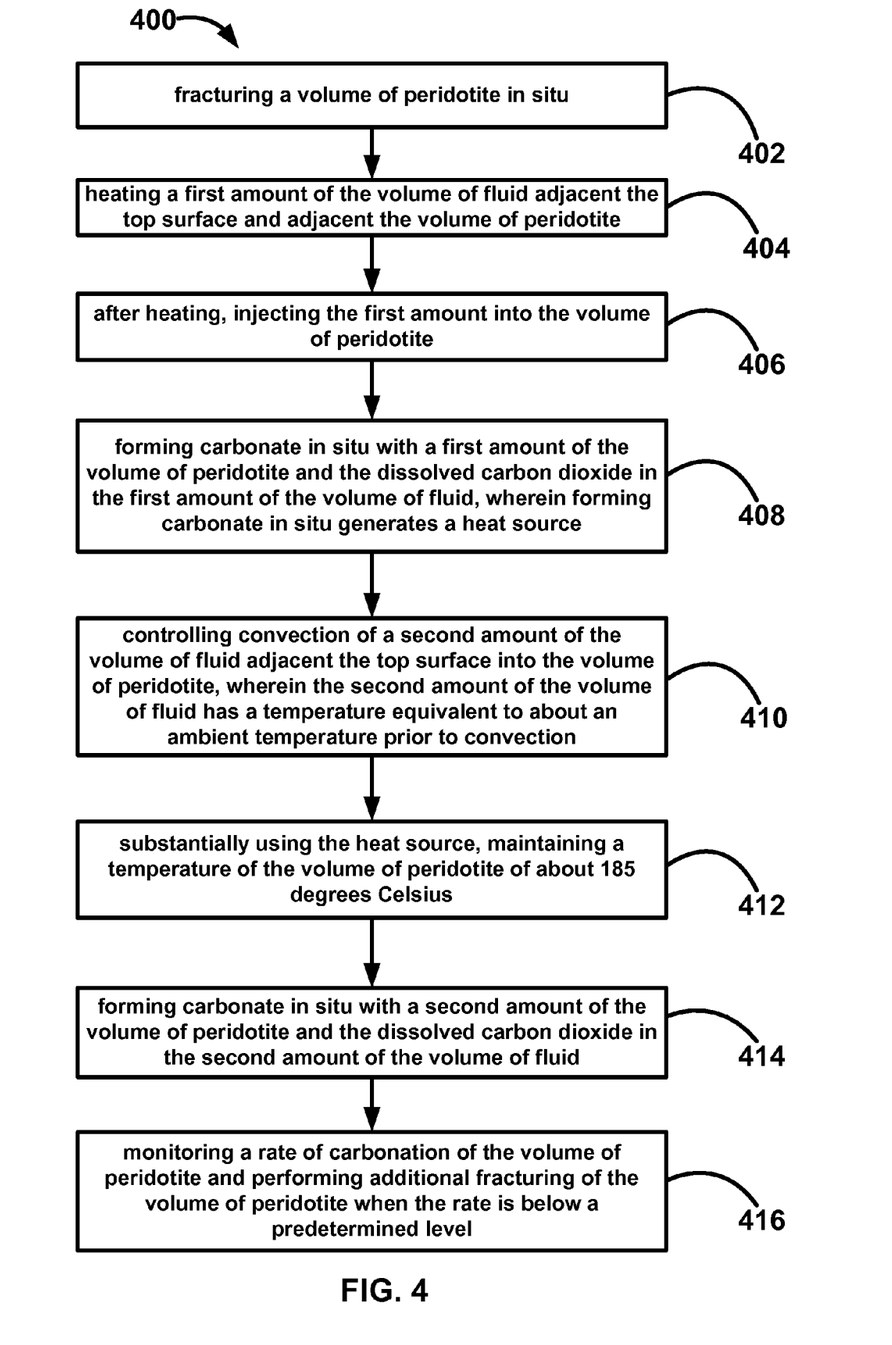
FIG. 4 is a chart of a method according to some embodiments of the disclosed subject matter.

Referring now to FIGS. 3 and 4, some embodiments of the disclosed subject matter include methods of enhancing rates of in situ carbonation of peridotite using a natural source of carbon dioxide, e.g., the dissolved carbon dioxide in seawater covering the peridotite rather than enriched carbon dioxide, as the reactive fluid. Using seawater, the carbonation of peridotite would be less efficient, since the concentration of carbon dioxide in seawater is only about 30 parts per million.

However, the exothermic hydration of peridotite (forming serpentine and other hydrated silicate minerals) as well as carbonation can sustain high temperature at depth. To achieve the same overall rate of peridotite carbonation, more holes can be drilled in this variation compared to methods using purified carbon dioxide. Embodiments according to FIGS. 3 and 4 are methods for carbon dioxide capture from the shallow ocean, and hence from the atmosphere in equilibrium with the shallow ocean. Such methods eliminate or lessen the need for purified carbon dioxide from a power plant or some other source. The extra cost of this less efficient method can be offset by eliminating the cost of carbon dioxide capture at a power plant or other industrial source, and the cost of carbon dioxide transportation from source to peridotite storage location.

As shown in FIG. 3, for a volume 300 of peridotite that is located close to a floor 302 and a top surface 303 of a body 304 of water, e.g., an ocean or sea, controlled convection of seawater 306 into and out of the volume of peridotite (as indicated by arrows) can be used to both heat the peridotite to a temperature suitable for carbonation and to provide a source of carbon dioxide for the carbonation reactions.

Referring now to FIG. 4, some embodiments include a method 400 of enhancing rates of in situ carbonation of peridotite. At 402 of method 400, a volume of peridotite is fractured in situ. As mentioned above, the volume of peridotite is typically located beneath a volume of fluid such as a sea or an ocean. The volume of fluid includes dissolved carbon dioxide. At 404, a first amount of the volume of fluid adjacent a top surface and adjacent the volume of peridotite is heated. Typically, the volume of peridotite is heated to about 185 degrees Celsius, which, as described further below, is a substantially optimal temperature for promoting carbonation reactions. At 406, after heating, the first amount of the volume of fluid, e.g., heated seawater in some embodiments, is injected into the volume of peridotite. At 408, carbonate is formed in situ with a first amount of the volume of peridotite and the dissolved carbon dioxide in the first amount of the volume of fluid. At the same time carbonate is formed in situ, heat from the exothermic carbonation reactions generates a heat source for maintaining the temperature of the volume of peridotite. At 410, convection of a second amount of the volume of fluid adjacent the top surface into the volume of peridotite is controlled. The second amount of the volume of fluid has a temperature equivalent to about an ambient temperature prior to convection. At 412, substantially using the heat source, a temperature of the volume of peridotite is maintained at about 185 degrees Celsius. At 414, carbonate is formed in situ with a second amount of the volume of peridotite and the dissolved carbon dioxide in the second amount of the volume of fluid. At 416, a rate of carbonation of the volume of peridotite is monitored and additional fracturing of the volume of peridotite is performed when the rate is below a predetermined level.

Figure 5:
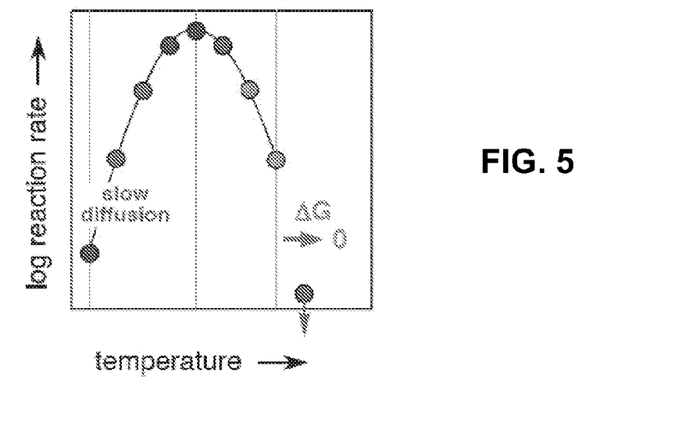
FIG. 5 is a chart of the reaction rate vs. temperature, which shows the typical carbonation rate of olivine.
Figure 6:
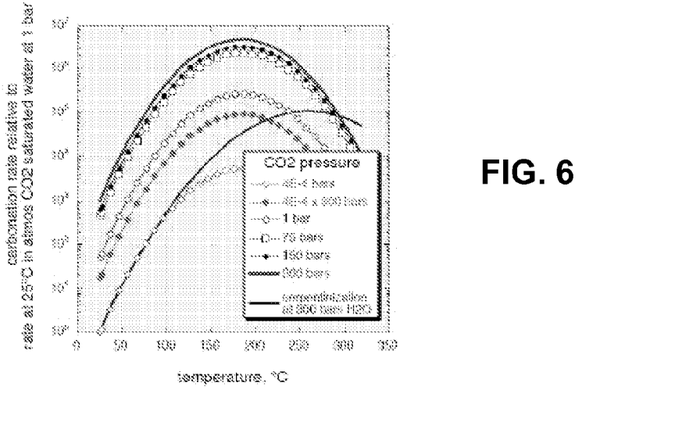
FIG. 6 is a chart of the rates of olivine carbonation and serpentinization as a function of temperature and pressure.

Referring now to FIGS. 5-7, research indicates that an additional increase in the carbonation rate, by a factor of more than about $10^6$ can be achieved by optimizing reaction conditions using methods and systems according to the disclosed subject matter, e.g., raising the temperature of the peridotite to an optimal temperature and injecting carbon dioxide at an optimal pressure and optimal flow rate.

As shown in FIGS. 5 and 6, heating and raising the partial pressure of carbon dioxide can increase the carbonation rate by a factor of more than $10^6$ by speeding-up the diffusive kinetics of hydration and carbonation. However, the chemical potential driving the reaction is reduced as the temperature approaches the equilibrium phase boundary for serpentine or carbonate mineral stability. The combined effect yields a maximum reaction rate at a temperature intermediate between surface conditions and the equilibrium phase boundary. The reaction rate for serpentinization as a function of temperature was found to have a maximum value at about 260 degrees Celsius over a range of carbon dioxide pressures, while the rate of carbonation is optimized at about 185 degrees Celsius and about 150 to 300 bars carbon dioxide pressure.

Referring now to FIG. 7, the rate of change of temperature due to olivine carbonation was calculated at a carbon dioxide pressure of 300 bars as a function of peridotite temperature and carbon dioxide fluid flow rate. At high carbon dioxide flow rates with cold fluid, i.e., about 25 degrees Celsius, it has been found that the volume of peridotite cannot be heated by exothermic reactions. At low carbon dioxide flow rates, advective cooling is negligible and temperature can be controlled by exothermic heating and diffusive cooling. Optimal olivine carbonation rates have been found to occur when carbon dioxide fluid flow is adjusted to yield about $dT/dt=0$ at about 185 degrees Celsius. It was found that a constant peridotite temperature of about 185 degrees Celsius can be maintained by pumping 25 degrees Celsius carbon dioxide at about 0.040 m/s or by pumping 25 degrees Celsius $H_2O$ at about $4.1 \times 10^{-6}$ m/s.

It was found that the range of temperature derivatives and steady state flow rates at about 185 degrees Celsius are much larger for the olivine carbonation reaction than for serpentinization reactions. Heating due to hydration/serpentinization was found to be less effective than heating due to carbonation. This is partly because, for example at 1 bar and 25 degrees Celsius, $\Delta H$ is about 250 kJ/kg for serpentinization, while carbonation evolves about 760 kJ/kg, and partly because serpentinization is slower than carbonation for temperatures between 25 and 185 degrees Celsius (see FIG. 6).

Methods and systems according to the disclosed subject matter offer benefits and advantages over known methods and systems. Under some conditions, exothermic peridotite alteration, i.e., serpentinization and carbonation, can sustain high temperature and rapid reaction, with carbonation up to $10^6$ times faster than natural rates potentially consuming billions of tons of carbon dioxide per year.

The potential for in situ mineral carbonation in peridotite is emphasized in the following: there is about $2.9 \times 10^{15}$ kg of carbon dioxide in the atmosphere, up from a pre-industrial value of about $2.2 \times 10^{15}$ kg. The Samail ophiolite in Oman is greater than 350 km long, about 40 km wide, and has an average thickness of about 5 km. Approximately 30 percent of this volume is residual mantle peridotite. Adding 1 percent by weight carbon dioxide to the peridotite would consume one-quarter of the estimated atmospheric carbon dioxide—an amount roughly equivalent to the increase since the industrial revolution. Converting all of the Mg cations in the peridotite to carbonate would consume about $7 \times 10^{16}$ kg of carbon dioxide. Other ophiolite peridotite massifs of similar size are in Papua New Guinea (about 200×50 km in area), New Caledonia (about 150×40 km), and along the east coast of the Adriatic Sea (several massifs of about 100×40 km). There are hundreds of cubic kilometers of peridotite on every continent, with relatively large deposits in the countries of Morocco, Spain, Venezuela, India, Pakistan, Iran, and Japan, in the regions of Tibet and the Ural Mountains of Russia, in the States of Alaska, California, Oregon, Washington, Montana, and Vermont, and in the Canadian province of Quebec.

Because methods and systems of in situ mineral carbonation according to the disclosed subject matter utilize the chemical potential energy inherent in tectonic exposure of mantle peridotite at the Earth's surface, the optimal temperature for carbonation can be maintained in a rock volume at little expense. Further, rock volumes at depth are, inherently, at relatively high pressure and elevated temperature. Thus, compared to engineered, mineral carbonation "at the smokestack", methods and systems according to the disclosed subject matter do not involve quarrying and transportation of peridotite, processing of solid reactants via grinding and heat treatment, or maintaining high temperature and pressure in a reaction vessel. Instead, the major energy investments in methods and systems according to the disclosed subject matter are for drilling, hydraulic fracturing, pumping fluid, preheating fluid, and purification of carbon dioxide. Also, unlike "smokestack" mineral carbonation, methods and systems according to the disclosed subject matter allow for both on-site carbon dioxide capture and transport of purified carbon dioxide to the in situ carbonation locality.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A system for sequestering carbon dioxide via in situ carbonation of peridotite, said system comprising:
    a fracturing module for fracturing a volume of peridotite in situ;
    a carbon dioxide injection module including a carbon dioxide source and means for injecting carbon dioxide from said carbon dioxide source into said volume of peridotite in situ;
    a heating module for heating said volume of peridotite in situ; and
    a control module including temperature sensors configured to measure temperatures of said volume of peridotite and said carbon dioxide source, a pressure sensor configured to measure a pressure of said carbon dioxide source, carbonation sensors configured to measure a rate carbonation of said volume of peridotite, and an analysis sub-module configured to analyze data generated by said temperature, pressure, and carbonation sensors, where the control module is configured to control said fracturing module, said heating module, and said carbon dioxide injection module based on said analysis of said data generated by said temperature, pressure, and carbonation sensors.

2. The system of claim 1, wherein said fracturing module includes means for drilling and hydraulic fracturing said volume of peridotite in situ.

3. The system of claim 1, said heating module comprising:
    a volume of fluid;
    a heat source for heating said volume of fluid thereby creating a heated volume of fluid;
    a conduit formed between said heated volume of fluid and said volume of peridotite; and
    a pump for pumping said heated volume of fluid to said volume of peridotite.

4. The system of claim 1, said carbon dioxide injection module comprising:
    a conduit between said carbon dioxide source and said volume of peridotite; and
    a compressor for compressing said carbon dioxide source thereby increasing a pressure of said carbon dioxide source.

5. The system of claim 1, wherein said control module is configured to direct said fracturing module to perform additional fracturing of said volume of peridotite when said rate of carbonation is below a predetermined level.

6. The system of claim 1, wherein said control module is configured to discontinue operation of heating module when heat from a carbonation reaction of said volume of peridotite is capable of maintaining a temperature of about 185 degrees Celsius in said volume of peridotite.

* * * * *